April 17, 1951  F. ALLEN  2,549,280
CUTTERS, SHEARS, OR THE LIKE
Filed Nov. 29, 1949
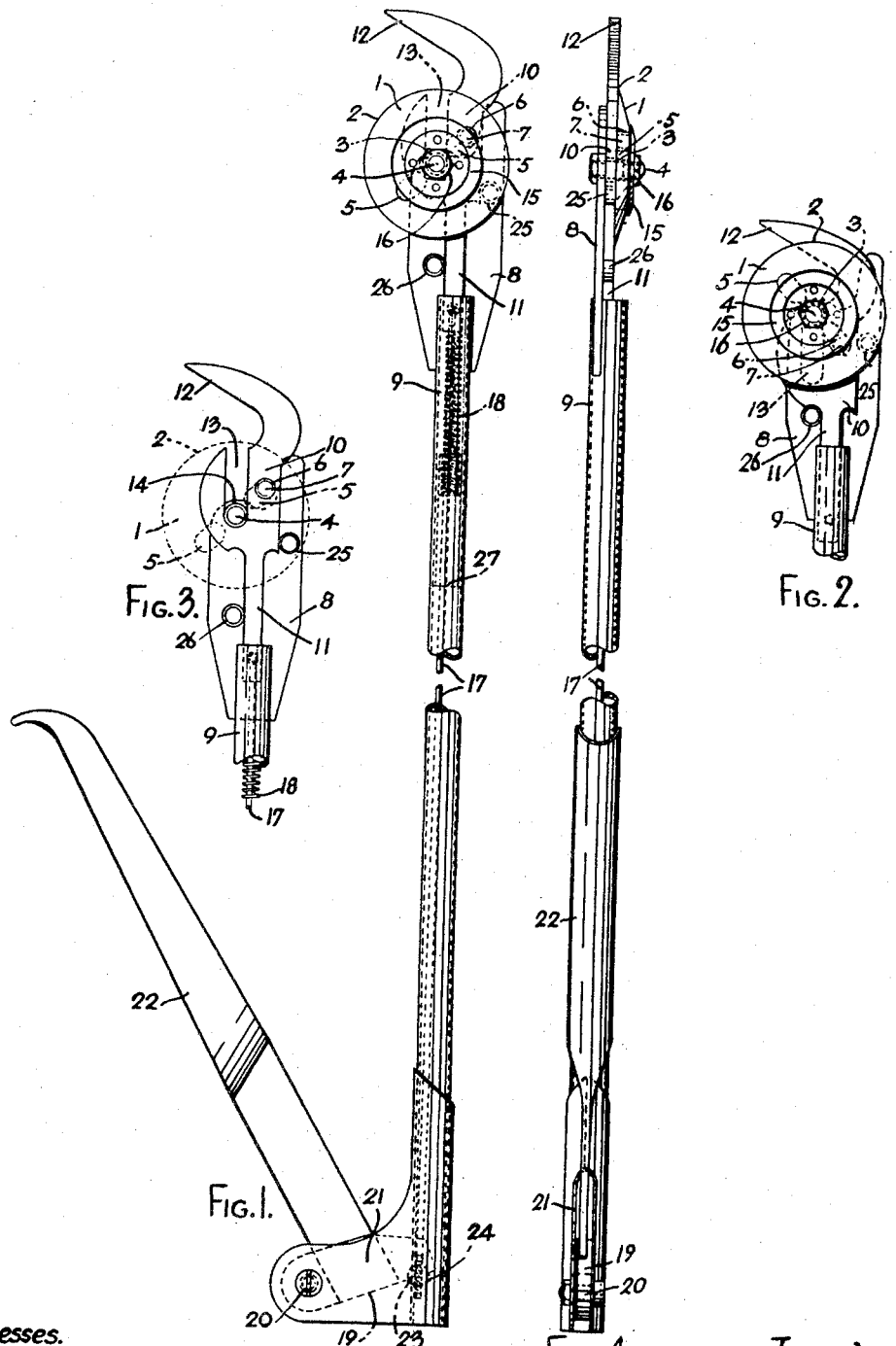
Witnesses.
Inventor.
Frederick Allen.
per
Attorney.

Patented Apr. 17, 1951

2,549,280

UNITED STATES PATENT OFFICE 2,549,280

CUTTERS, SHEARS, OR THE LIKE

Frederick Allen, Gosport, England, assignor to Sidney Hilliard, Saanichton, British Columbia, Canada Application November 29, 1949, Serial No. 129,991
In Great Britain October 13, 1949

2 Claims. (Cl. 30—237)

The invention relates to pruning shears or the like of the type comprising two co-acting cutting blades which are not merely pivoted together to provide a scissor or shearing action, but also have a relative sliding motion for the purpose of producing a combined draw-cut and shear.

Pruning shears of the above type are known which comprise a reciprocatory cutting blade adapted to slide in a rectilinear guide-way in a bracket fixed on one end of a handle, and an arcuate cutting blade which is pivoted on the bracket and has a slot for the reception of a stud which is fixed on the reciprocatory blade, so that the pivoted blade is oscillated when the reciprocatory blade is reciprocated, the two blades co-acting to effect a combined draw-cut and shear.

The objects of the present invention are to increase the length of cutting edge of the oscillatory blade which co-operates with the edge of the reciprocatory blade without necessitating increase in the stroke or sliding movement of the reciprocatory blade, and to permit of easy removal and re-adjustment of the oscillatory blade so that when a part of its operative cutting edge has become worn, another part can be brought into use.

With these objects in view, the pruning shears according to the invention have an oscillatory cutter in the form of a disc of comparatively large diameter, and a reciprocatory cutter of adequately increased length, the disc being easily removable and capable of being replaced in different positions in operative connection with the reciprocatory cutter so that different parts of the circumference can be brought into use to act as the cutting edge.

In the drawings:

Figure 1 is a front view of shears in the open condition.

Figure 2 is a front view of the upper part only in the closed condition.

Figure 3 is a front view of the upper part only and with the cutting disc removed but indicated in dotted lines.

Figure 4 is a side view corresponding to Figure 1.

In the example of pruning shears illustrated in the drawings, a disc 1 of about two and a quarter inches diameter is formed and ground with one side flat and the other side bevelled to form a circular or circumferential cutting edge 2.

The disc has a central hole 3 for a spindle 4, and two radial slots 5—5 for the selective reception of a roller 6 on an operating stud 7 referred to below. The spindle 4 is screwed at one end into a bracket 8 fixed on a tubular handle 9. A sliding plate 10 on the stem 11 of a reciprocatory cutter 12 slides on the bracket 8 and between it and the flat side of the cutter disc 1, the spindle 4, passing through a slot 13 in the plate 10 and having an anti-friction roller 14 fitting the slot.

The outer end of the spindle 4 is screw-threaded to receive a disc nut or washer 15 and an ordinary lock nut 16.

The stud 7 provided with the operating roller 6 is fixed on the plate 10.

The stem 11 passes down the tubular handle 9, being connected to a pull rod 17, furnished with a return spring 18. The rod 17 is adapted at its lower end to be depressed by an operating lever 19 pivotally mounted at 20 in a forked bracket 21 on the end of the tubular handle 9, the lever 19 having a hand grip 22 fixed to it so that when the hand grip is moved towards the tubular handle 9, it rocks the lever 19 to pull down the rod 17 to operate both cutters 1 and 12, the spring 18 returning both cutters when the hand grip is released.

The operating lever 19 preferably has a hook or beak 23 adapted to bear on a brass or other cylindrical nut 24 on the lower end of the pull rod 19.

Adjustment of the nut 24 adjusts the spring 18.

Guide rollers 25 and 26 are provided on the bracket 8 and engage respectively with one edge of the plate 10 and with an opposing edge of the stem 11.

The pull rod 17 slides in a collar 27 which also forms an abutment for the adjacent end of the spring 18.

As the circumference of the cutter disc 1 is well beyond or at a comparatively longer radius than that at which the operative roller 6 acts, a considerable length of the cutting edge 2 of the disc 1 comes into use at each partial rotation.

The reciprocatory cutter 12 with which it co-operates is also appropriately lengthened. If this part of the cutting edge 2 becomes worn, the disc 1 can be easily removed and shifted round to bring the next radial slot 5 in position to receive the operating roller 6, so that a different part of the circumferential cutting edge 2 is brought into use.

I claim:

1. Pruning shears comprising a reciprocatory cutter and an oscillatory cutter for co-operation therewith, a bracket forming a slide support for said reciprocatory cutter and also having a pivot for said oscillatory cutter, said reciprocatory cutter having a roller for operating said oscillatory cutter and said oscillatory cutter being in the form of a disc removably mounted on said pivot and being provided with a number of slots for selective reception of said operating roller, for the purpose of enabling said disc to be removed and replaced in different positions in operative connection with said reciprocatory cutter so that different parts of said disc can be brought into use to act as the cutting edge.

2. Pruning shears as specified in claim 1 wherein the reciprocatory cutter has a stem formed with a broad sliding plate which has a slot for passage of the pivot of the oscillatory cutter, and wherein guide rollers are provided on the bracket for engagement with opposing edges of said plate and stem.

FREDERICK ALLEN.

No references cited.